(12) United States Patent
Koyama

(10) Patent No.: US 6,556,234 B1
(45) Date of Patent: Apr. 29, 2003

(54) METHOD FOR PERSONALIZING A DATA STORAGE MEDIUM

(75) Inventor: Hirofumi Koyama, Saitama (JP)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/116,606

(22) Filed: Jul. 16, 1998

(51) Int. Cl.[7] .................................. B41J 2/435
(52) U.S. Cl. ........................ 347/264; 347/239
(58) Field of Search .................. 347/264, 239; 346/137

(56) References Cited

U.S. PATENT DOCUMENTS

| | | | |
|---|---|---|---|
| 4,066,268 A | | 1/1978 | Borchard et al. .............. 274/42 |
| 4,622,564 A | * | 11/1986 | Kaku et al. .................. 347/239 |
| 4,899,224 A | * | 2/1990 | Ooba et al. ............. 347/118 X |
| 4,967,286 A | | 10/1990 | Nomula et al. ............. 358/342 |
| 5,126,995 A | * | 6/1992 | Nishizawa ............... 347/137 X |
| 5,317,337 A | | 5/1994 | Ewaldt ........................ 347/224 |
| 5,504,688 A | * | 4/1996 | Letourneau .................. 700/95 |
| 5,518,325 A | | 5/1996 | Kahle .......................... 400/70 |
| 5,608,718 A | | 3/1997 | Schiewe ................. 369/275.4 |
| 5,669,995 A | * | 9/1997 | Hong ........................... 369/94 |
| 5,781,221 A | * | 7/1998 | Wen et al. .................. 347/232 |

FOREIGN PATENT DOCUMENTS

| | | |
|---|---|---|
| EP | 0329122 | 8/1989 |
| EP | 0682341 | 11/1995 |
| EP | 0762407 | 3/1997 |
| GB | 2277827 | 11/1994 |
| JP | JP8287526 A | 11/1996 |
| JP | JO8287526 A | 11/1996 |

OTHER PUBLICATIONS

EPO Search Report dated Dec. 9, 1997 citing above documents AA, AB and AL–AO.

* cited by examiner

*Primary Examiner*—Lamson Nguyen
(74) *Attorney, Agent, or Firm*—Joseph S. Tripoli; Paul P. Kiel

(57) ABSTRACT

The invention relates to a method for personalizing a recordable data storage medium. At least one property of a non-recorded data area is modified in the same way as if data were recorded thereby creating determined patterns on or in the data storage medium. The property to modify may be an optical property rendering the determined patterns visible to human eyes. The invention further relates to a data storage medium comprising the mentioned determined patterns and to a device for transferring determined patterns on or in a data storage medium.

11 Claims, 3 Drawing Sheets

METHOD FOR PERSONALIZING A DATA STORAGE MEDIUM

BACKGROUND OF THE INVENTION

1. Field of the Invention

The invention relates to a method for personalizing a data storage medium. More precisely at least one property of a non-recorded data area is modified thereby creating determined patterns on or in the data storage medium. The invention also relates to a data storage medium which carries such determined patterns, and to a device for transferring such determined patterns on or in the data storage medium.

A data storage medium is commonly used to store data in its specific data areas. Recording data in these data areas often results in the modification of at least one property where data is recorded, i.e. a modification of a physical property. Eventually the modifications lead to a coded representation in the data areas, e.g. in binary or analog code, of the data to record. The property to change depends on the nature of the data storage medium used. The property may for example be a magnetization if the data storage medium is a magnetic tape or disc, or a physical deformation of a surface in case of an optical disk. In the latter case the data is typically stored along concentric or spiral tracks which define a recorded data area of the disc having different optical properties than non recorded data areas, e.g. a modified reflectance. The difference between non recorded and recorded data areas may be seen through the eyes of a user.

2. Description of Prior Art

In order to label a data storage medium, such that a user may identify the data storage medium by reading the label with his eye, it is known to print a label on information areas of the data storage medium not designed as data areas to record data. The U.S. Pat. No. 5,317,337, Ewaldt, shows an apparatus for printing label information in the form of graphics and/or characters on a disk shaped information carrier. The label information is prepared by a data processing system and transferred to a printer. The printer prints the label information directly on an information area. The apparatus for printing is distinct from an apparatus used for recording data in data areas. As a consequence, two distinct operations, namely printing and recording are required when producing a recorded data storage medium.

SUMMARY OF THE INVENTION

It is an object of the present invention to eliminate the above-mentioned disadvantages encountered in the Prior Art by providing a solution for simply personalizing a data storage medium without using a separate apparatus for printing.

In one aspect the present invention provides a method for personalizing a recordable data storage medium comprising modifying at least one property of non recorded data areas of the data storage medium to store data and creating a determined pattern by further using the modifying of the one property of determined non recorded data areas.

In a second aspect the present invention provides a data storage medium on or in which data is represented in data areas which have at least one property different from that of a non-recorded data area. The data storage medium comprises determined data areas representing determined patterns and having the one property different from that of a non-recorded data area.

In a third aspect the present invention provides a device for transferring determined patterns on or in a data storage medium, comprising processing means to process the determined patterns and transferring means to transfer the processed determined patterns on or in the data storage medium. The transferring means act on a data area of the data storage medium designed to store data by modifying a property of a determined non-recorded data area in a similar manner as if data is stored such to create the determined patterns.

BRIEF DESCRIPTION OF THE DRAWINGS

Other objects and aspects of the invention will become apparent from the following description of embodiments with reference to the accompanying drawings, in which.

DETAILED DESCRIPTION OF THE PREFERED EMBODIMENTS

Figure 1:
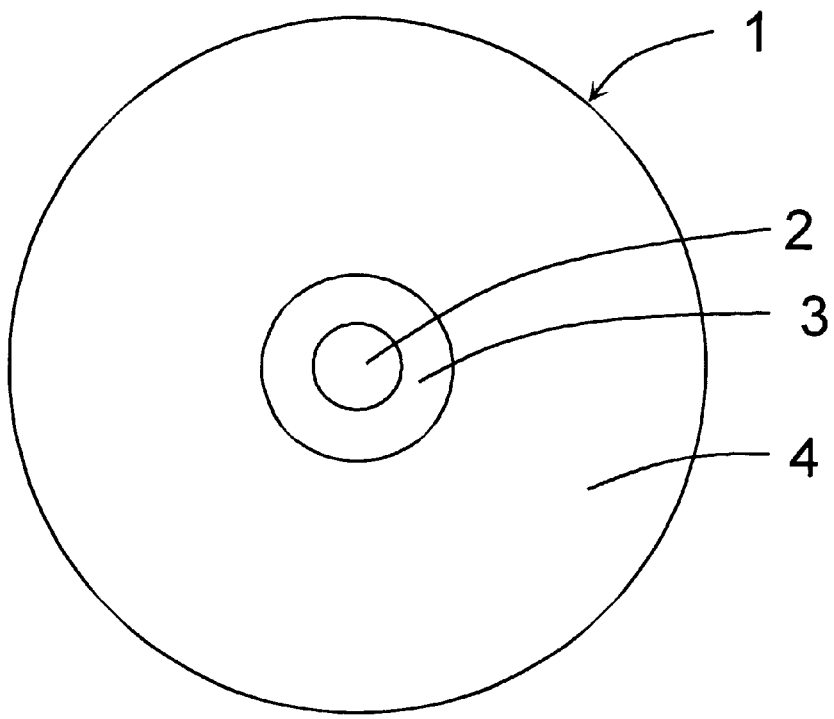
FIG. 1 is a diagrammatic upper view of a disk shaped data storage medium.

A disk shaped data storage medium 1 shown in FIG. 1 comprises a central opening 2 for a driving unit, an annular area 3 surrounding the opening 2 and an annular data area 4 designed to store data. The data storage medium 1 is empty which means that no data is stored in the data area 4. The data storage medium 1 may for example be an optical disk which is readable using a light source and an optical reading head (not shown).

Figure 2:
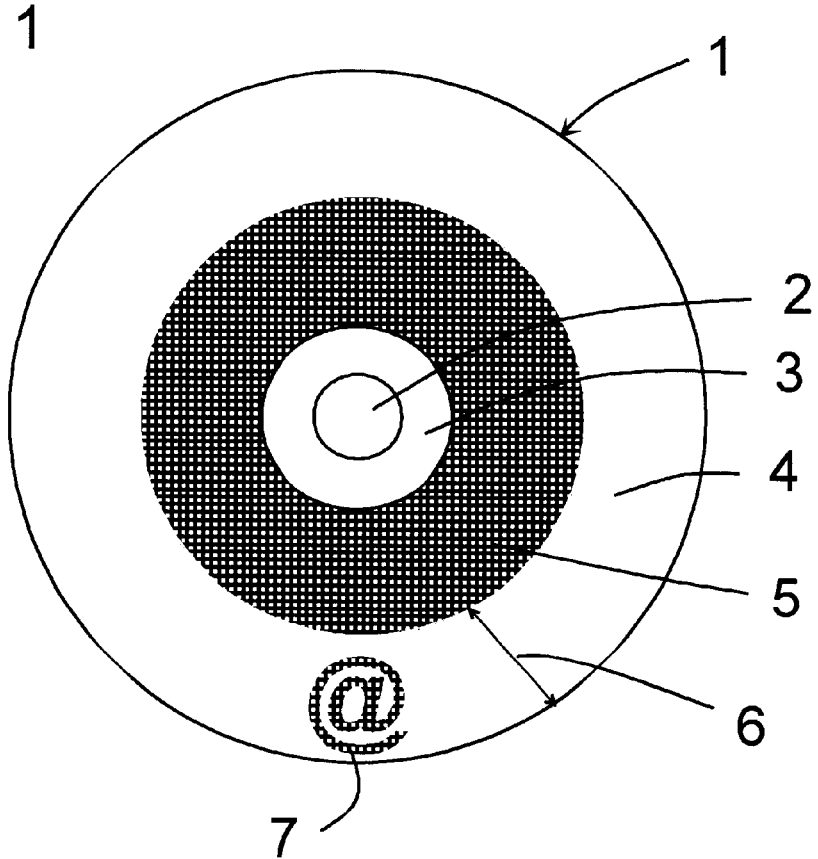
FIG. 2 is a diagrammatic view of a recorded data area and a determined pattern on the data storage medium shown in FIG. 1.

Data is stored on the data storage medium 1 in concentric or spiral tracks (not shown) departing from an outer periphery of the annular area 3. In FIG. 2 an annular area 5 of recorded data increases its radial width towards an outer periphery of the data area 4 as more data is recorded. The recording of data in the data area 4 causes a modification of an optical property thereof. The modified optical property of the optical disk may for example be the reflectance of a surface defined by the data area 4. This means that recorded data areas of the data area 4 will reflect electromagnetic, more precisely optomagnetic radiation in a different way than non recorded data areas. Therefore, a reflectance of the annular area 5 of recorded data is different from that of a non recorded data area having a radial width 6. This allows a user to distinguish with his eyes the annular area 5 of recorded data from the non recorded data area having the radial width 6. The same kind of modification caused by recording data is used to create the determined pattern 7, i.e. "@" in the non recorded data area of the data area 4. For the reasons depicted above, namely the modified reflectance, the determined pattern 7 may be viewed from a user through his eyes. The determined pattern 7 is a modified data area delimited by adjacent non recorded data areas. For the sake of labeling the data storage medium 1 with patterns visible through user's eyes, the information carried by the determined pattern 7 lies in its delimitation.

The modifying of optical properties makes it possible for a user to identify the optical medium using his eyes in a similar manner as if the label comprising the determined patterns would have been printed using ink.

The data storage medium 1 may for example be a write once disk better known as a WORM disk. Let us take an example of a CD-R disk. It reflects white light as green or blue light. Non recorded parts of the data area generally appear as dark green or dark blue whereas recorded parts become light green or light blue. A contrast between non recorded data areas and recorded data areas is approximately 0.7 to 1 and is clearly visible through eyes. The creating of determined patterns in non recorded data areas of the CD-R is simply done for example by additional laser scanning or by means of contact mask transferring.

A simple way to realize user defined patterns on write once or rewritable optical discs is provided.

Many other kinds of data storage media may be used for creating the determined patterns on or in them. As an example a multilayer optical disc in which the data area comprises a multiplicity of superposed layers to store data could reflect different colors depending on the layer. By modifying the reflectance of each layer appropriately it would be possible to mix colors in the reflected light and create colored determined patterns.

Depending on the use of the data storage medium, different properties may be chosen to be modified. This may depend on means available to identify the modified property. The means may be of sensory nature, e.g. touching, or perhaps of optical nature, e.g. a camera or a human eye.

Figure 3:
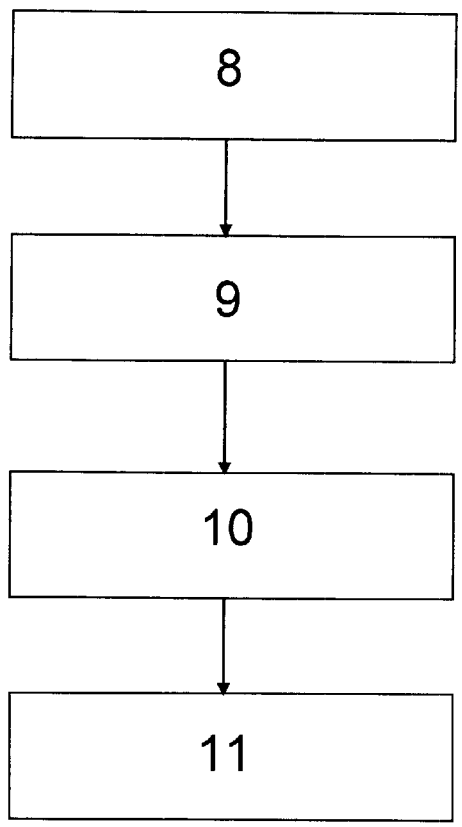
FIG. 3 shows a flowchart for use in a device according to the invention.

Determined patterns may be created on a data storage medium according to a flowchart shown in FIG. 3. In a box 8 residual non recorded data areas of the data storage medium are determined. These areas comprise for the data storage medium 1 shown in FIG. 2 the non recorded annular area of the data area 4, which has the radial width 6.

In box 9 the determined patterns are processed, e.g. they may be inputted, shown on a display to the user, formatted etc . . . (not shown). Box 9 could of course also be placed before box 8. In box 10 an output of box 9 is converted to obtain a transfer format for the processed determined patterns. An output of box 10, i.e. the transfer format is transmitted to transferring means in box 11 which modify the residual non recorded data area in an appropriate way to make the determined patterns appear on the data storage medium.

Thus the space available for creating the determined patterns on the storage medium may be taken in account typically after recording data in the data areas. The determined patterns may be varied in their size and in their number.

The processing done in box 9 may for example be realized using a graphical data processing device (not shown) well known by a man skilled in the art. Graphical data processing devices typically use specialized software.

In many disk formats (WORM or recordable), the addresses determining the location on the disk are contained in performatted grooves in order to allow recording of data on the disk with high precision. One may use these addresses in the non recorded data area to obtain the transfer of the processed determined patterns on the data storage medium.

Figure 4:
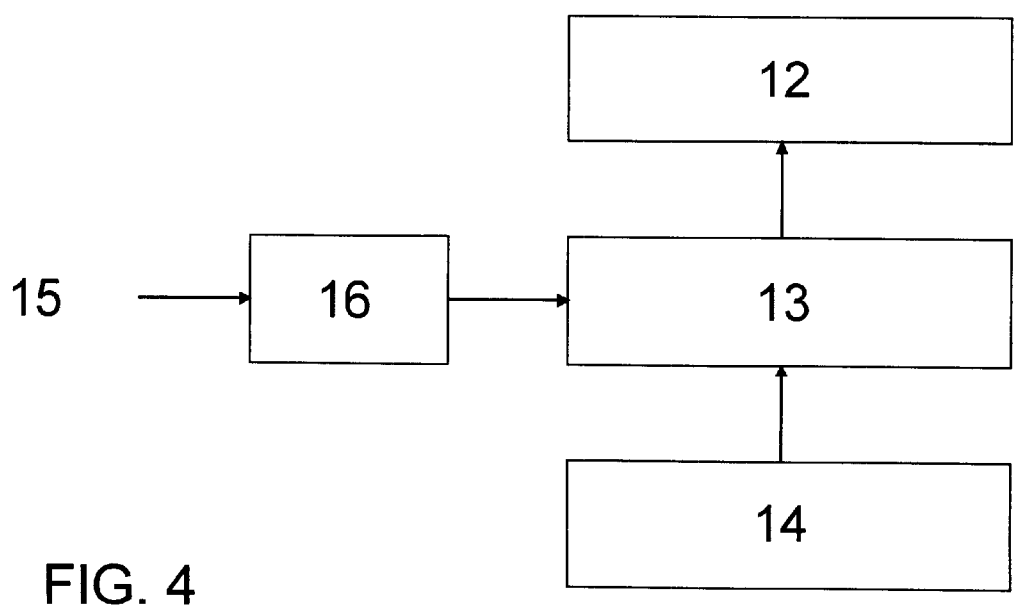
FIG. 4 is a diagrammatic view of a device according to the invention.

In FIG. 4 a diagrammatic view shows a device which is used to store data 14 on a data storage medium 12. Recording means 13 modify data areas (not shown) of the data storage medium 12 to store the data 14. Determined patterns 15 are processed using processing means 16 and processed determined patterns are transferred on the data storage medium 12 with the recording means 13.

The recording means 13 may be a part of the transferring means in box 11, and the processing means 16 may correspond to the boxes 8, 9 and 10 shown in FIG. 3.

As an example the recording means for a write once optical disk, e.g. a CD-R disk, comprise a laser with a relative high power output. On recording this laser illuminates a surface of organic dye layer and heats up the dye. A physical property of the dye is changed and pits representing data are formed, thus the data area is modified.

An advantage of using the device in FIG. 4 is that a device normally used for recording data in data areas may now also be used for labeling the data storage medium with determined patterns. The need for a separate apparatus for printing is eliminated. More precisely there is no need for a data storage medium mastering device.

Another advantage is that the device may be a consumer device with which the consumer may personalize every single data storage medium he/she records.

Figure 5:
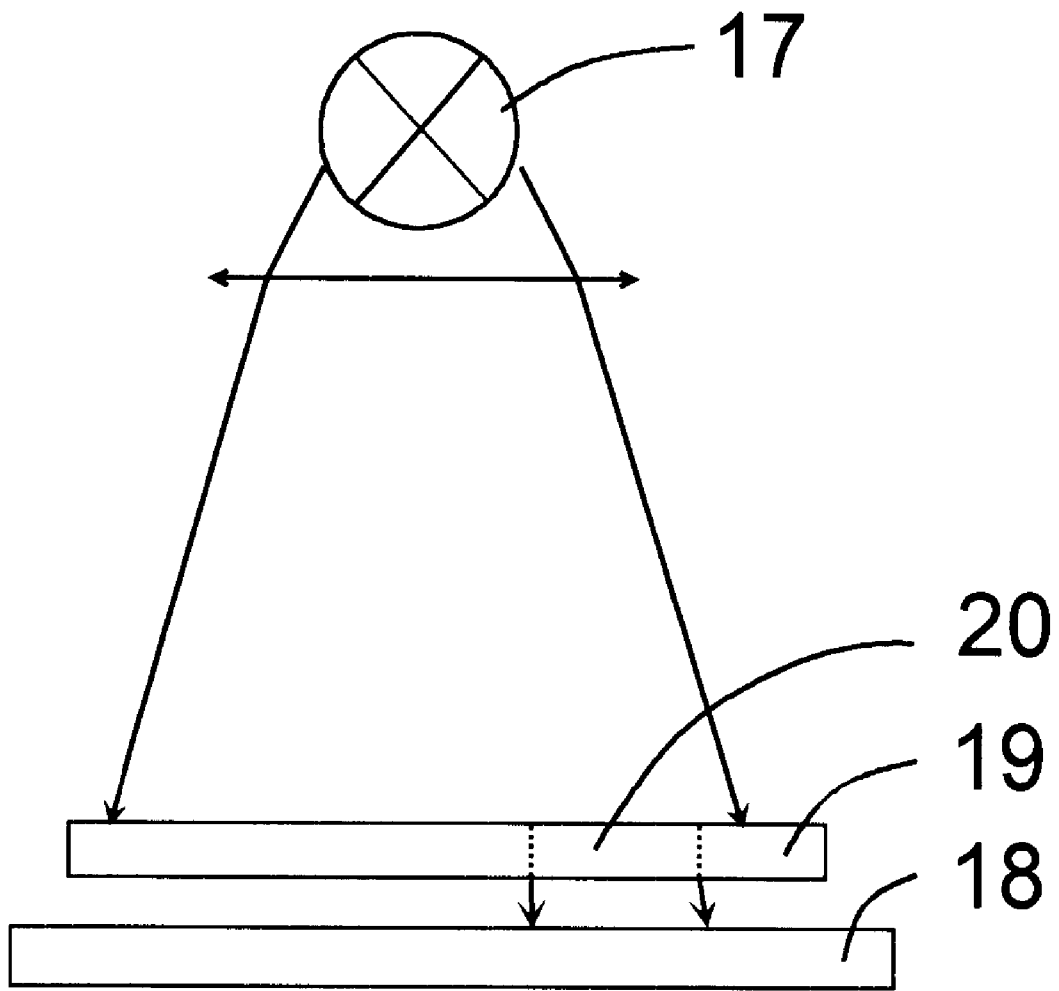
FIG. 5 shows a device according to the invention.

FIG. 5 schematically illustrates a side view of a device in which a radiation source 17 illuminates a data area of a data storage medium 18 through masking means 19. The masking means 19 have at least an opening 20 corresponding to determined patterns, these determined patterns being projected on or in the data storage medium 18. The data storage medium's data area is sensitive to the radiation emitted by the radiation source 17 and is modified according to a shape defined by the opening 20.

The masking means 19 may comprise a LCD shutter. In this case the LCD shutter may be externally controlled to variably create a plurality of determined patterns depending on a user's needs.

In a preferred embodiment of the above detailed examples the modification inside the data areas representing determined patterns may be made non homogeneously.

The non homogeneous modification may for example result in a gradation of the modified property. Hence, if the modified property is the reflectance of the surface, the reflectance may be varied inside the determined patterns. The non homogeneous modification may for example be obtained by varying an amplitude of electromagnetic radiation absorbed by the surface. It may also be obtained by varying the duration of exposure of the data areas representing determined patterns to electromagnetic radiation.

What is claimed is:

1. A method for personalizing a recordable data storage medium comprising the steps of:

providing a recordable data storage medium having a data storage area that includes an already recorded data area and a non recorded data area, said already recorded and non recorded data areas having different optical properties caused by recording of data; and modifying a property of said non recorded data area to create determined patterns on said recordable data storage medium using a same modification process used to record data in said already recorded data area, whereby personalized visual information is added to said recordable data storage medium.

2. A method according to claim 1 in which the modifying changes a visible property of said non recorded data area.

3. A recordable data storage medium produced by the method of claim 1.

4. A method according to claim 1 further comprising the step of determining a location for modifying said property of said non recorded data area of the recordable data storage medium to store data by using addresses associated with preformatted groove portions on or within said recordable data storage medium.

5. A method according to claim 1 further comprising the step of modifying the property of more than one layer of the recordable data storage medium, the recordable data storage medium being a recordable multilayer optical disc having multiple layers reflecting different colors to mix colors of the determined patterns created by modifying the property of said non recorded data area.

6. A method according to claim 1 further comprising the steps of:

determining residual non recorded data areas on said recordable data storage medium;

planning a scheme to modify said residual non recorded data areas; and transferring said scheme onto said residual non recorded data areas by using said same modification process used for recording data in said recordable data storage medium.

7. A device for transferring determined patterns on or in a recordable data storage medium comprising:

a recordable data storage medium having a data storage area including an already recorded data area and a non recorded data area, said already recorded and non recorded data areas having different optical properties caused by recording of data;

means for modifying a property of said non recorded data area to create determined patterns on said recordable data storage medium by using addresses associated with selected preformatted groove portions on or within said recordable data storage medium.

8. A device according to claim 7 further comprising a data recording head to modify said property of said non recorded data area to store data and to create said determined patterns.

9. A device according to claim 7 further comprising a masking means having an opening corresponding to the determined patterns and a source of radiation, the masking means being located between the source of radiation and the recordable data storage medium.

10. A device according to claim 9 wherein the masking means comprises a LCD shutter.

11. A device according to claim 7 further comprising addresses determining means for determining the location on the recordable data storage medium for modifying at least one property of said non recorded data area of the recordable data storage medium by using addresses associated with preformatted groove portions on or within said recordable data storage medium.

* * * * *